No. 740,146. PATENTED SEPT. 29, 1903.
A. LA FRANCIS & F. J. KRUMEICH.
BORAX RUBBING MACHINE.
APPLICATION FILED FEB. 11, 1901.
NO MODEL. 3 SHEETS—SHEET 1.

WITNESSES: INVENTORS:
Henry Krug Anthony La Francis,
Russell M. Everitt Frank J. Krumeich,
BY
Drake & Co.
ATTORNEYS.

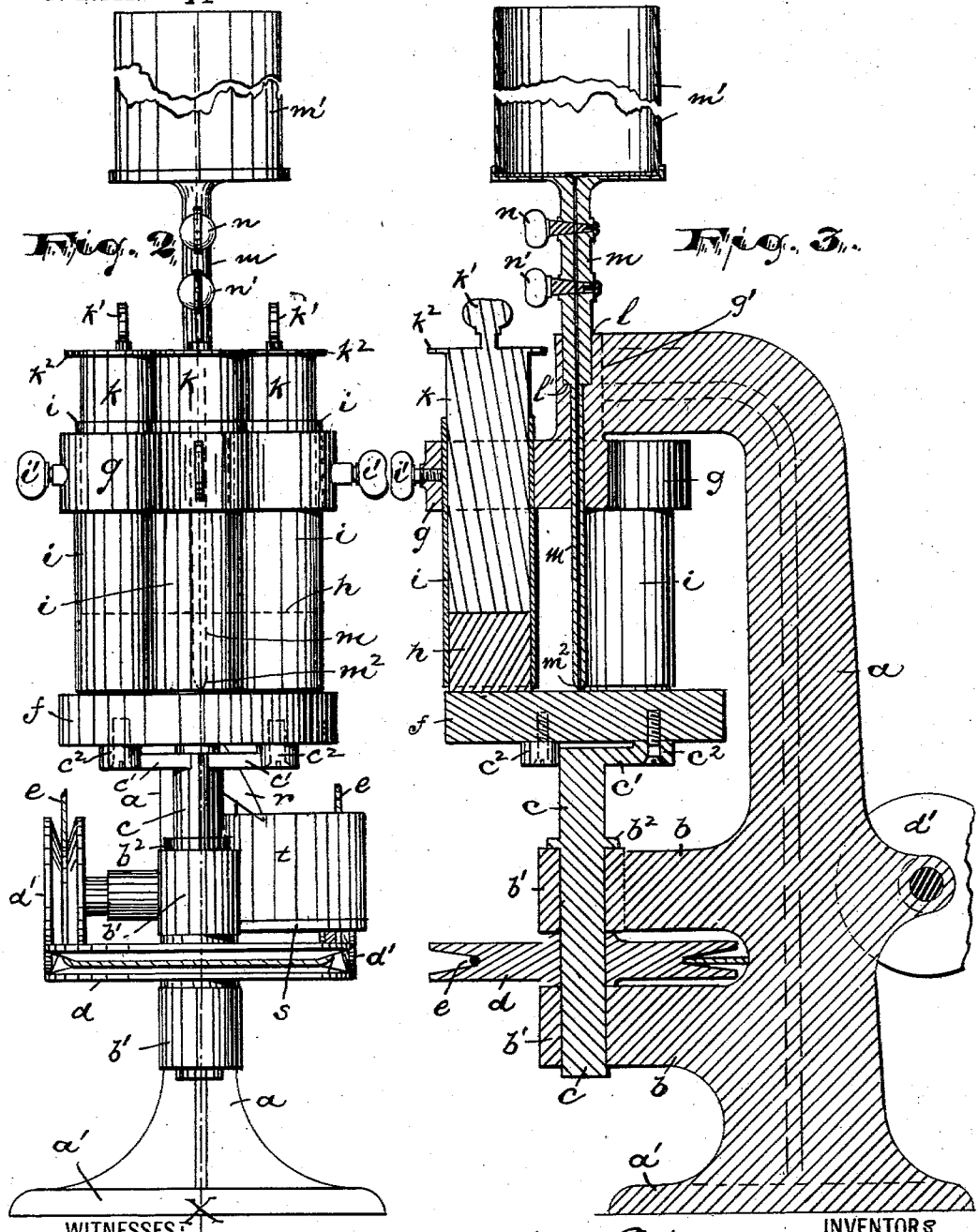

No. 740,146. PATENTED SEPT. 29, 1903.
A. LA FRANCIS & F. J. KRUMEICH.
BORAX RUBBING MACHINE.
APPLICATION FILED FEB. 11, 1901.
NO MODEL. 3 SHEETS—SHEET 3.

WITNESSES: Henry Krug
Russell M. Everett

INVENTORS: Anthony La Francis,
Frank J. Krumeich,
BY Drake & Co.
ATTORNEYS.

No. 740,146.                                                     Patented September 29, 1903.

UNITED STATES PATENT OFFICE.

ANTHONY LA FRANCIS, OF EAST ORANGE, AND FRANK J. KRUMEICH, OF NEWARK, NEW JERSEY.

BORAX-RUBBING MACHINE.

SPECIFICATION forming part of Letters Patent No. 740,146, dated September 29, 1903.

Application filed February 11, 1901. Serial No. 46,813. (No model.)

*To all whom it may concern:*

Be it known that we, ANTHONY LA FRANCIS, residing at East Orange, and FRANK J. KRUMEICH, residing at Newark, in the county of Essex and State of New Jersey, citizens of the United States, have invented certain new and useful Improvements in Borax-Rubbing Machines; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The nature of our invention will be best understood by remembering that in manufacturing jewelry, light sheet-metal ware, &c., where considerable hard-soldering is done, large quantities of borax are used to secure a clean union of the parts being joined. This borax is furnished as a solid in the form of sticks, and a solution or fluid is secured by rubbing the end of the stick on a concaved stone moistened with a little water. This rubbing if done by hand is very tedious and laborious; and the general object of our invention is to provide an improved machine for doing the work.

Other objects are to enable a plurality of sticks of borax to be ground at one time in uniform relation to the stone, to provide an even and uniform supply of water to the several sticks, to secure a collection of the fluid as it is produced without interfering with the grinding and without wasting or losing any of said fluid, to obtain a simple and efficient machine, and to secure other advantages and results, some of which may be referred to hereinafter in connection with the description of the working parts.

The invention consists in the improved borax-rubbing machine and in the arrangements and combinations of parts of the same, all substantially as will be hereinafter set forth and finally embraced in the clauses of the claim.

Figure 1:
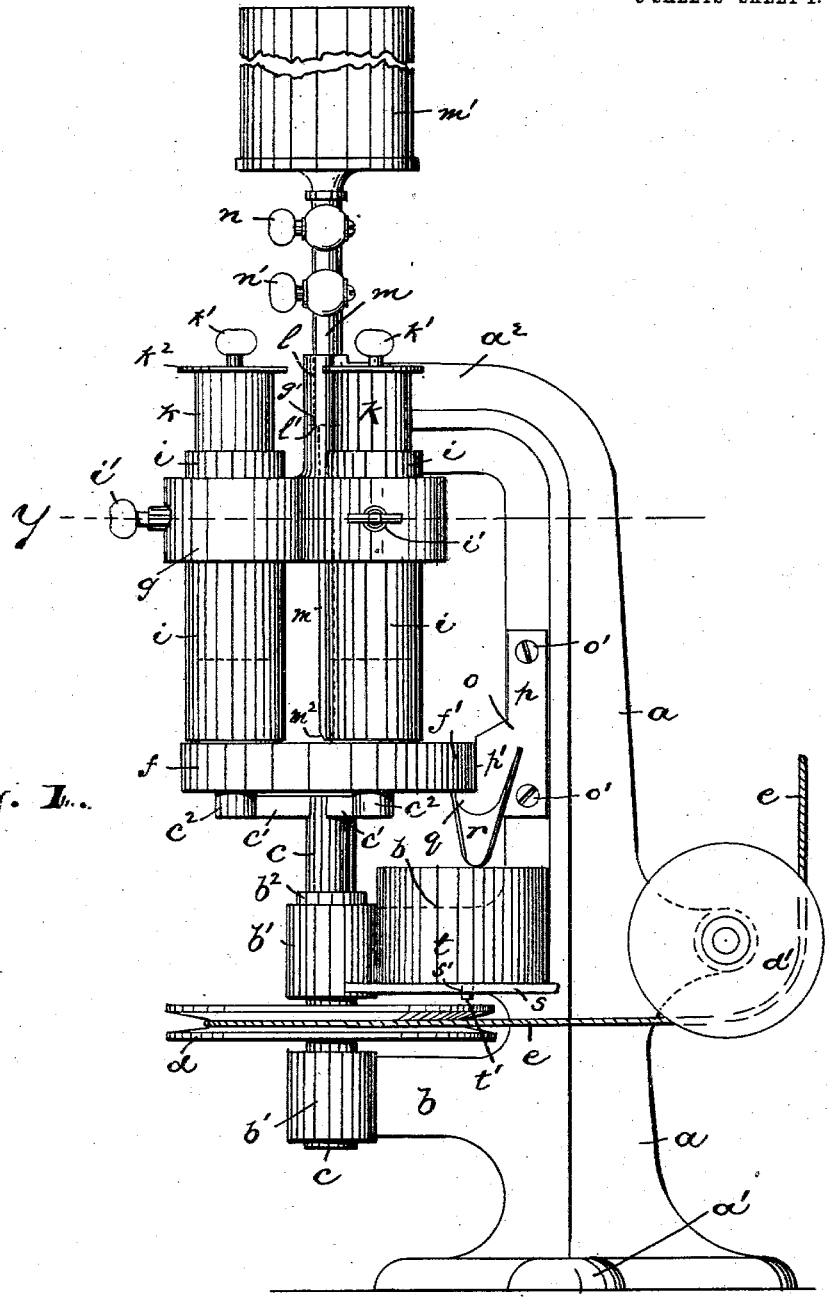
Figure 4:
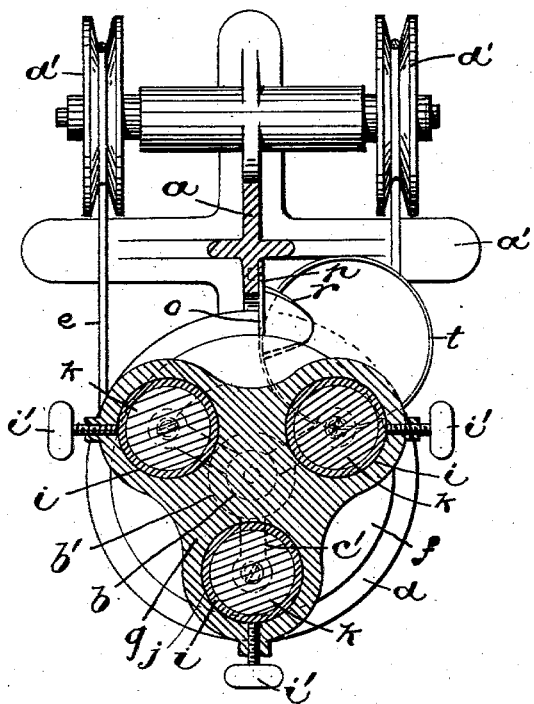
Figure 5:
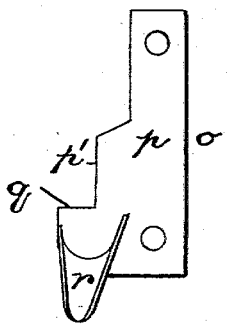
Figure 6:
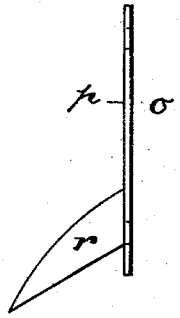

Referring to the accompanying drawings, in which like letters of reference indicate corresponding parts in each of the several figures, Figure 1 is a side elevation of the improved machine. Fig. 2 is a front view of the same. Fig. 3 is a vertical central section on line $x$, Fig. 2. Fig. 4 is a cross-section taken on line $y$, Fig. 1; and Figs. 5 and 6 are detail views showing in front and side elevation, respectively, a certain collecting spout or plate.

In said drawings, $a$ indicates a frame cast out of metal or otherwise suitably formed and adapted to be screwed at its lower end $a'$ to the floor and extend upward therefrom. From the lower part of the said frame arms $b\ b$ project forward, which provide vertical journals $b'$ for a vertical shaft $c$. Said shaft is adapted to be rotated in said bearings by any suitable means, being held against longitudinal movement downward by a collar $b^2$ or by any other equivalent means. We have shown said shaft $c$ as rotated by a grooved pulley $d$, fast on the said shaft and around which a belt $d'$ is adapted to pass, said belt being led away over idle pulleys $d'\ d'$ to any suitable power means. It is evident, however, that any system of gearing or other means might be used to transmit motion to the shaft $c$. Said shaft $c$ at its upper end has outwardly-projecting radial arms $c'$, forming a base upon which lies a circular or disk-like grinding-stone $f$ in horizontal position. The extremities of the arms $c'$, as at $c^2$, preferably receive holding-screws extending upward into the stone $f$, whereby the stone is connected to the shaft $c$ to rotate therewith. The grinding-stone $f$ is preferably flat on its upper surface with its circular edge extending downward at right angles to said upper surface, although the stone might, if desired, be concaved or convexed at the top and have its edges inclined. The upper end of the frame $a$ bends over, as at $a^2$, and supports a horizontal plate $g$ above the grinding-stone preferably by a vertical stem $g'$ on the plate. Said plate, stem, and the frame $a$ may be all one integral piece, or any two integral, or all separate and connected by any suitable known means, as may be found most convenient in manufacture. In said plate $g$, which is preferably of a trifoliate shape, is a series of openings $j'$, located at equal distances from the center, and in each of said openings is arranged a cylindrical tube $i$, said tube fitting nicely in the opening $j$ in the plate and being held by a set-screw $i'$, extending inward from the edge of the plate. Said tubes are to be thus adjusted in height so that their lower ends lie slightly above the grinding-stone $f$, and into each of the tubes is then dropped a stick of borax $h$, which rests at its lower end upon the grinding-stone $f$ when the machine is to be used.

Into the top of each tube $i$ above the stick of borax $h$ is dropped a cylindrical weight $k$, which rests upon the top of the stick of borax and presses its lower end against the grinding-stone. The upper end of the weight has a handle $k'$ for convenience and also a peripheral stop $k^2$ to prevent the weight from dropping against the grinding-stone when the borax is used up.

Through the plate $g$ and its stem $g'$ extends a vertical passage or socket $l$, which receives the downwardly-extending delivery-tube $m$ of a water tank or reservoir $m'$. Said seat or socket $l$ is reduced in diameter at its lower part to form a shoulder $l'$, upon which a corresponding shoulder of the tube $m$ sits, and the lower extremity of the delivery-tube $m$ is brought to a nozzle $m^2$, terminating close to the grinding-stone $f$ at its center. Above the point of support of the said delivery-tube $m$ and below the reservoir $m'$ are two stop-cocks $n$ and $n'$, arranged in the delivery-tube, the upper one of which can be freely turned into open or closed position to stop or start the flow of water, the other or lower cock $n'$ being permanently turned at such an angle as to give the desired size of stream at the nozzle $m^2$.

From the foregoing description of the machine it will be seen that as the grinding-stone $f$ is rotated it engages the several sticks of borax each in the same relative position to the stone and that the supply of water issuing from the nozzle $m^2$ at the center of the stone will be equally and uniformly distributed by centrifugal force to the several sticks of borax alike. Furthermore, while the water is thus supplied (preferably by drops) to the part of the grinding-disk having the least motion it will be noted that the sticks of borax engage the stone at the part having the greatest motion, since the holders $i$ are substantially flush at their outer sides with the outer edges of the grinding-disk. While a considerable action of the stone upon the sticks of borax is thus secured, the water is supplied gently and almost imperceptibly, so that there is no splashing or agitation such as would prevent a smooth uniform mixture of the borax with the water and a retention of said mixture on the stone until of necessary syrupy consistency.

The fluid or semifluid resulting from the grinding or rubbing operation is urged by centrifugal force over the edges of the grinding-stone; but because of its thick syrupy consistency it does not run off the stone until drops of considerable size have gathered. Before such drops have formed large enough to detach themselves the rotation of the grinding-stone brings them around to a scraper or collector $o$, fastened upon the frame $a$ by screws $o'$ at one side of the grinding-stone, special reference being had to Fig. 1. Said collector $o$, which is shown in detail in Figs. 5 and 6, comprises a plate $p$, of sheet metal, vertically arranged with an edge $p'$ close to, but not touching, the peripheral side $f'$ of the grinding-stone. Below said edge $p'$ is an offset $q$ of the plate, which extends in under the grinding-stone, and to the face of the plate $p$ is attached below the edge $p'$ a spout $r$, into which the fluid scraped from the grinding-stone runs. A shelf $s$, which may be either cast on the frame or bolted thereto, provides a support for a vessel $t$ to receive the fluid from the spout $r$ and from which the workmen can take such fluid as they need it in their work. Said shelf preferably has an aperture $s'$ to receive a lug $t'$ in the vessel $t$ and prevent displacement of said vessel from the shelf.

Various modifications of construction may be made and well-known equivalents substituted for the parts positively described herein without departing from the spirit and scope of the invention, and we do not wish to be limited by our positive description except as the state of the art may require.

Having thus described the invention, what we claim as new is—

1. In a borax-rubbing machine, the combination of a horizontal and rotatable grinding-disk presenting a flat top in the form of a complete circle and being supported wholly from beneath, means for rotating said grinding-disk, a fixed arm extending radially in over the top of the grinding-disk and carrying a single integral supporting-frame having a perforation in vertical line with the center of the grinding-disk and a series of apertures around said perforation, a water-supply tube having a straight discharge end seated in said perforation and terminating at its open extremity close to the grinding-disk, and tubular holders adjustably mounted in the said surrounding apertures of the supporting-frame and adapted to receive sticks of borax.

2. The combination of the frame $a$, having at its lower portion upper and lower arms $b'$, provided with bearings for a vertical shaft, said vertical shaft, and means for rotating the same, a solid grinding-disk mounted in horizontal position upon the upper end of said shaft and having a flat top, said frame extending upward at one side of the grinding-disk and bending radially inward over the same and being perforated in vertical line with the center of the grinding-disk, a water-supply duct having a straight discharge end seated in said perforation and terminating at its open extremity adjacent to the top of the grinding-disk, and holders upon said inwardly-bent end of the upper part of the frame adapted to receive sticks of borax, and being arranged in an annular series around said water-tube.

3. In a borax-rubbing machine, the combination with a horizontal grinding-disk having a flat unbroken top and being supported from beneath, and means for rotating the same, of a water-supply pipe approaching the grinding-disk perpendicularly at its center and terminating closely adjacent thereto in a single discharge-opening, whereby the water is supplied to that part of the grinding-disk having the least motion, and means for holding sticks of borax in engagement with said top of the grinding-disk.

4. In a borax-rubbing machine, the combination with a horizontal circular grinding-disk having a flat unbroken top and being supported from beneath, and means for rotating the same, of a water-supply pipe approaching the grinding-disk perpendicularly at its center and terminating closely adjacent thereto in a single discharge-opening, whereby the water is supplied to that part of the grinding-disk having the least motion, and holders arranged around said water-supply pipe parallel thereto and each adapted to receive a stick of borax, said holders being arranged with their outer sides substantially flush with the edges of the grinding-disk, whereby the sticks of borax engage the grinding-disk at its part having the greater motion, substantially as set forth.

In testimony that we claim the foregoing we have hereunto set our hands this 23d day of January, 1901.

ANTHONY LA FRANCIS.
FRANK J. KRUMEICH.

Witnesses:
CHARLES H. PELL,
J. E. ALEXANDER.